(12) United States Patent
Zhang et al.

(10) Patent No.: US 11,941,807 B2
(45) Date of Patent: Mar. 26, 2024

(54) ARTIFICIAL INTELLIGENCE-BASED MEDICAL IMAGE PROCESSING METHOD AND MEDICAL DEVICE, AND STORAGE MEDIUM

(71) Applicant: Tencent Technology (Shenzhen) Company Limited, Shenzhen (CN)

(72) Inventors: Fubo Zhang, Shenzhen (CN); Dong Wei, Shenzhen (CN); Kai Ma, Shenzhen (CN); Yefeng Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 406 days.

(21) Appl. No.: 17/503,160

(22) Filed: Oct. 15, 2021

(65) Prior Publication Data
US 2022/0036550 A1 Feb. 3, 2022

Related U.S. Application Data

(63) Continuation of application No. PCT/CN2020/105461, filed on Jul. 29, 2020.

(30) Foreign Application Priority Data

Aug. 15, 2019 (CN) .......................... 201910752632.6

(51) Int. Cl.
*G06T 7/00* (2017.01)
*G06F 18/214* (2023.01)
*G06N 3/04* (2023.01)

(52) U.S. Cl.
CPC .......... *G06T 7/0012* (2013.01); *G06F 18/214* (2023.01); *G06N 3/04* (2013.01); *G06T 2207/10081* (2013.01)

(58) Field of Classification Search
CPC ......... G06T 7/0012; G06T 2207/10081; G06T 7/11; G06T 2207/10088;
(Continued)

(56) References Cited

U.S. PATENT DOCUMENTS 9,589,374 B1 * 3/2017 Gao ..................... A61B 6/5211
10,387,748 B2 * 8/2019 Chen ........................ G06T 7/11
(Continued)

FOREIGN PATENT DOCUMENTS

CN 109493347 A 3/2019
CN 109685813 A 4/2019
(Continued)

OTHER PUBLICATIONS

Tencent Technology, WO, PCT/CN2020/105461, Nov. 2, 2020, 5 pgs.
(Continued)

*Primary Examiner* — Tom Y Lu
(74) *Attorney, Agent, or Firm* — Morgan, Lewis & Bockius LLP

(57) ABSTRACT

The present disclosure provides an artificial intelligence-based (AI-based) medical image processing method performed by a computing device, and a non-transitory computer-readable storage medium. The AI-based medical image processing method includes: processing a medical image to generate an encoded intermediate image; processing the encoded intermediate image, to segment a first feature and generate a segmented intermediate image; processing the encoded intermediate image and the segmented intermediate image based on an attention mechanism, to generate a detected intermediate input image; and performing second feature detection on the detected intermediate input image, to determine whether an image region of the
(Continued)

detected intermediate input image in which the first feature is located comprises a second feature.

20 Claims, 6 Drawing Sheets

(58) Field of Classification Search
CPC . G06T 2207/20081; G06T 2207/20084; G06T 2207/30101; G06F 18/214; G06F 18/24; G06N 3/04; G06N 3/045; G06N 3/048; G06V 10/764; G06V 10/774; G06V 10/25
See application file for complete search history.

(56) References Cited

U.S. PATENT DOCUMENTS

| | | | |
|---|---|---|---|
| 10,902,585 B2 * | 1/2021 | Nett | ............................ G06T 7/11 |
| 11,744,472 B2 * | 9/2023 | Zhao | ....................... A61B 5/021 |
| | | | 600/481 |
| 2013/0346346 A1 * | 12/2013 | Criminisi | ................. G06N 7/01 |
| | | | 706/12 |
| 2018/0204088 A1 | 7/2018 | Chen et al. | |
| 2019/0200893 A1 * | 7/2019 | Grouchy | ............... G06T 3/4007 |

FOREIGN PATENT DOCUMENTS

| | | |
|---|---|---|
| CN | 109978037 A | 7/2019 |
| CN | 109993726 A | 7/2019 |
| CN | 110458833 A | 11/2019 |

OTHER PUBLICATIONS

Tencent Technology, IPRP, PCT/CN2020/105461, Feb. 8, 2022, 6 pgs.
Ming Liu et al., "Study on the Segmentation Method of Liver and Liver Tumor Based on CT Image", Proceedings of China Medical Equipment Conference and 2019 Medical Equipment Exhibition, Jul. 18, 2019, 4 pgs., Retrieved from the Internet: https://wap.cnki.net/touch/web/Conference/Article/YZBZ201907001002.html.
Tencent Technology, ISR, PCT/CN2020/105461, Nov. 2, 2020, 3 pgs.

* cited by examiner

ARTIFICIAL INTELLIGENCE-BASED MEDICAL IMAGE PROCESSING METHOD AND MEDICAL DEVICE, AND STORAGE MEDIUM

CROSS-REFERENCE TO RELATED APPLICATIONS

This application is a continuation application of PCT Patent Application No. PCT/CN2020/105461, entitled "ARTIFICIAL INTELLIGENCE-BASED MEDICAL IMAGE PROCESSING METHOD AND MEDICAL DEVICE, AND STORAGE MEDIUM" filed on Jul. 29, 2020, which claims priority to Chinese Patent Application No. 201910752632.6, entitled "ARTIFICIAL INTELLIGENCE-BASED MEDICAL IMAGE PROCESSING METHOD AND MEDICAL DEVICE, AND STORAGE MEDIUM" filed with the China National Intellectual Property Administration on Aug. 15, 2019, all of which are incorporated herein by reference in their entireties.

FIELD OF THE TECHNOLOGY

The present disclosure relates to the field of intelligent medical treatment, and specifically, to an artificial intelligence-based (AI-based) medical image processing method and medical device, and a storage medium.

BACKGROUND OF THE DISCLOSURE

Artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, the AI is a comprehensive technology of computer science, which attempts to understand essence of intelligence and produces a new intelligent machine that can respond in a manner similar to human intelligence. The AI is to study the design principles and implementation methods of various intelligent machines, to enable the machines to have the functions of perception, reasoning, and decision-making. The AI technology is widely applicable in the conventional medical field. For example, a medical image obtained by a medical device may be processed by using a neural network, to perform feature detection faster and more accurately. In a conventional AI-based medical image processing method, only a two-dimensional (2D) image is involved, and a three-dimensional (3D) spatial characteristic of a disease-related feature is not fully used, thereby reducing the accuracy of a detection result.

SUMMARY

The present disclosure provides an AI-based medical image processing method, to perform feature detection based on medical prior knowledge and improve the accuracy of a detection result.

According to an aspect of the present disclosure, an AI-based medical image processing method is performed by a computing device, the method including: processing a medical image to generate an encoded intermediate image representing a structural feature of the medical image; segmenting the encoded intermediate image according to a first feature, to generate a segmented intermediate image; processing the encoded intermediate image and the segmented intermediate image based on an attention mechanism, to generate an attention-enhanced detected intermediate input image; and performing second feature detection on the detected intermediate input image, to determine whether an image region of the detected intermediate input image in which the first feature is located comprises a second feature.

According to another aspect of the present disclosure, a computing device is provided, including: an image acquisition apparatus, configured to obtain a medical image; a processor; and a memory, storing computer-readable instructions, the computer-readable instructions, when executed by the processor, performing the AI-based medical image processing method described above.

According to still another aspect of the present disclosure, a non-transitory computer-readable storage medium is provided, storing instructions, the instructions, when executed by a processor of a computing device, causing the computing device to perform the AI-based medical image processing method described above.

By using the AI-based medical image processing method provided in the present disclosure, feature detection may be performed based on medical prior knowledge of a to-be-detected second feature included in a first feature. The medical image is processed by using an encoding neural network, to generate an encoded intermediate image, a first feature is segmented by using a segmentation neural network, and a second feature is detected by using a detection neural network. During processing, the segmentation neural network and the detection neural network share the encoded intermediate image outputted by the encoding neural network, and a segmented intermediate image outputted by the segmentation neural network is introduced into the processing procedure of the detection neural network, so that the processing of the detection neural network more focuses on the first feature, thereby improving the accuracy of a detection result of the second feature.

BRIEF DESCRIPTION OF THE DRAWINGS

To describe the technical solutions of the embodiments of the present disclosure or the existing technology more clearly, the following briefly introduces the accompanying drawings required for describing the embodiments or the existing technology. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

The technical solutions of the embodiments of the present disclosure are clearly and completely described in the following with reference to the accompanying drawings of the embodiments of the present disclosure. Apparently, the described embodiments are some embodiments rather than all the embodiments of the present disclosure. All other embodiments obtained by a person of ordinary skill in the art based on the embodiments of the present disclosure without creative efforts fall within the protection scope of the present disclosure.

The "first", the "second" and similar terms used in the present disclosure do not indicate any order, quantity or significance, but are used to only distinguish different components. Similarly, a similar term such as "include" or "comprise" means that an element or an item appearing in front of the term covers an element or an item and equivalents thereof listed behind the term, but does not exclude another element or item. A similar term such as "connect" or "connection" is not limited to a physical or mechanical connection, but may include an electrical connection, whether direct or indirect.

Flowcharts are used in the present disclosure for describing steps of a method according to the embodiments of the present disclosure. It is to be understood that, the foregoing or following steps are not necessarily strictly performed according to an order. On the contrary, the steps may be performed in a reverse order or simultaneously. Meanwhile, other operations may be alternatively added to the processes.

The present disclosure provides an AI-based medical image processing method, to process a medical image by using a multitasking processing network including an encoding neural network, a segmentation neural network, and a detection neural network, and improve the accuracy of feature detection.

Figure 1:
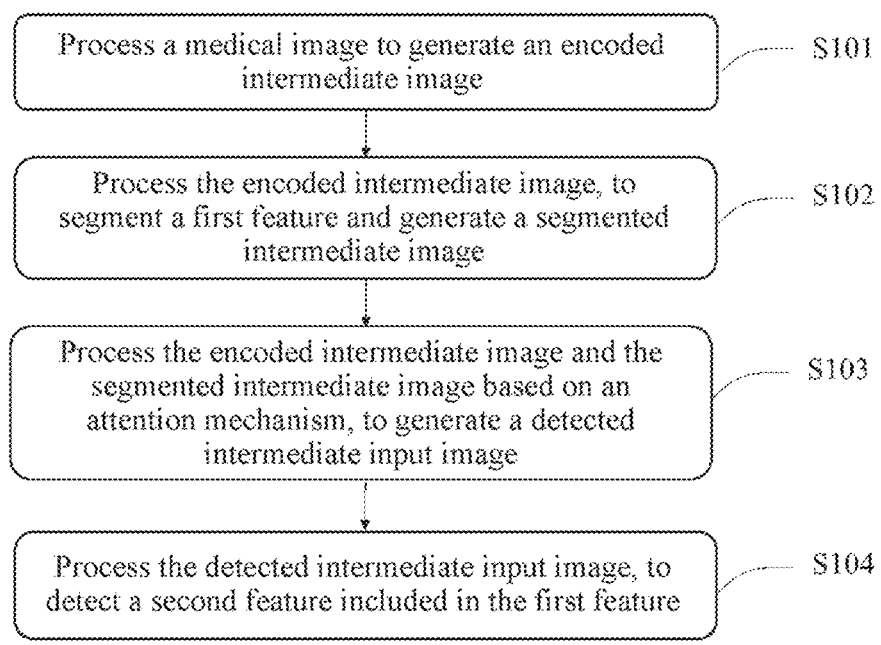
FIG. 1 is a flowchart of an AI-based medical image processing method according to an embodiment of the present disclosure.

FIG. 1 is a flowchart of an AI-based medical image processing method according to an embodiment of the present disclosure. The method in FIG. 1 may be performed by one or more computing devices, for example, a person computer (PC), a server, a server cluster, or a cloud computing network device. As shown in FIG. 1, first, in step S101, a medical image is processed to generate an encoded intermediate image.

According to the embodiments of the present disclosure, processing performed in step S101 may be performed by using an encoding neural network. The encoding neural network is a 3D convolutional neural network. That is, an input image of the encoding neural network is a 3D image. According to the embodiments of the present disclosure, the encoding neural network may include one or more convolutional neural networks, pooling layers, residual networks, and other structures, to encode inputted medical images to extract feature maps, and output one or more encoded intermediate images. The encoded intermediate image in the embodiments may be an image that is extracted by parsing a feature of the medical image using a preset encoding operation and that represents a structural feature of the medical image. In addition, an encoded intermediate image generated by the encoding neural network based on the 3D image is also a 3D image. The specific structure and processing manner of the encoding neural network are described in detail below.

According to the embodiments of the present disclosure, the medical image may be a computed tomography angiography (CTA) image. For example, an intracranial angiography image obtained by using a computed tomography (CT) device may be used as the medical image. The intracranial angiography images obtained by using the CT device include images of an intracranial vessel at different depth positions, to form a 3D image. For example, the size of the intracranial angiography image may be expressed as 512*512*256, where 512*512 indicates that the image has 512*512 pixels on a 2D plane, and includes a total of 256 layers of images, that is, corresponding to 256 depth positions. According to other embodiments of the present disclosure, the medical image may alternatively be a magnetic resonance angiography (MRA) image. Compared with the MRA image, the CTA image has the advantages of a lower price and a faster imaging speed. For example, the CTA image is used as a primary means of preliminary screening for intracranial aneurysms in China.

For an obtained CTA image, the CTA image may be further preprocessed before being inputted to the encoding neural network. For example, spatial resolutions of an intracranial angiography image with the size of 512*512*256 may be changed to 0.5×0.5×0.5 mm$^3$ through interpolation, and windowing is then performed on the intracranial angiography image, which is expressed as:

$$i_w = \begin{cases} 0, & I \leq WL - WW/2, \\ 255, & I \geq WL + WW/2, \\ (I - WL + WW/2)/WW, & \text{otherwise}, \end{cases}$$

where $i_W$ represents strength after the windowing, and I represents strength before the windowing. For the intracranial angiography image, WL and WW are usually set to WL=300, WW=600. The foregoing step of windowing is used to adjust the contrast of the obtained CTA image according to an imaging characteristic of a vascular tomography image, to highlight a vessel feature.

As shown in FIG. 1, in step S102, the encoded intermediate image is processed, to segment a first feature and generate a segmented intermediate image. The segmented intermediate image may be an image determined to have the first feature. The step is to segment the encoded intermediate image according to a first feature, to generate a segmented intermediate image including the first feature. According to the embodiments of the present disclosure, processing performed in step S102 may be performed by using a segmentation neural network. The segmentation neural network is a 3D convolutional neural network, that is, may process an inputted 3D image. Specifically, the first feature may be a feature of a body organ, such as a brain feature, a heart feature, or an artery feature.

Then, in step S103, the encoded intermediate image and the segmented intermediate image are processed based on an attention mechanism, to generate a detected intermediate input image. The intermediate input image is an attention-enhanced image that is generated by using the encoded intermediate image and the segmented intermediate image. According to the embodiments of the present disclosure, processing performed in step S103 may be performed by using an attention network.

Then, in step S104, the detected intermediate input image is processed, to detect a second feature included in the first feature. The step is to perform second feature detection on the detected intermediate input image, to determine whether an image region of the detected intermediate input image in which the first feature is located includes a second feature. According to the embodiments of the present disclosure, processing performed in step S102 may be performed by using a detection neural network. For example, the detection neural network may output a detection result of the second feature, where the detection result includes a parameter of a prediction box of the second feature and a prediction probability that the prediction box includes the second feature. The prediction box of the second feature refers to a region of the image in which the second feature is located.

According to the embodiments of the present disclosure, the detection neural network is a 3D convolutional neural network, that is, may process an inputted 3D image. According to the embodiments of the present disclosure, when the first feature is the artery feature, the second feature may be at least one of an aneurysm feature, an arterial vessel wall calcification feature, and an arterial vessel occlusion feature.

In the medical image processing method according to the present disclosure, an overall network structure including the encoding neural network, the segmentation neural network, and the detection neural network may be referred to as a multitasking processing network, and the multitasking may include a segmentation task of segmenting the first feature by the segmentation neural network and a detection task of detecting the second feature by the detection neural network. Both the segmentation neural network and the detection neural network perform processing based on the feature map outputted by the encoding neural network, that is, the encoded intermediate image. Because the first feature includes the second feature, an association relationship exists between the segmentation task and the detection task. For example, when the first feature is an arterial vessel feature and the second feature is the aneurysm feature, it can be learned based on basic medical knowledge that an aneurysm is formed because a blood flow in an artery hits a weak part of a vessel for a long time. Therefore, the aneurysm is an abnormal bulge on the artery and can only appear on the artery. In other words, the aneurysm feature is included in the arterial vessel feature. It can be learned based on the foregoing medical knowledge that the foregoing segmentation task and detection task are associated, and the processing of the segmentation task helps improve the accuracy of the detection task. The specific structure and processing procedure of the multitasking processing network according to the present disclosure are described in detail below with reference to the accompanying drawings.

Figure 2:
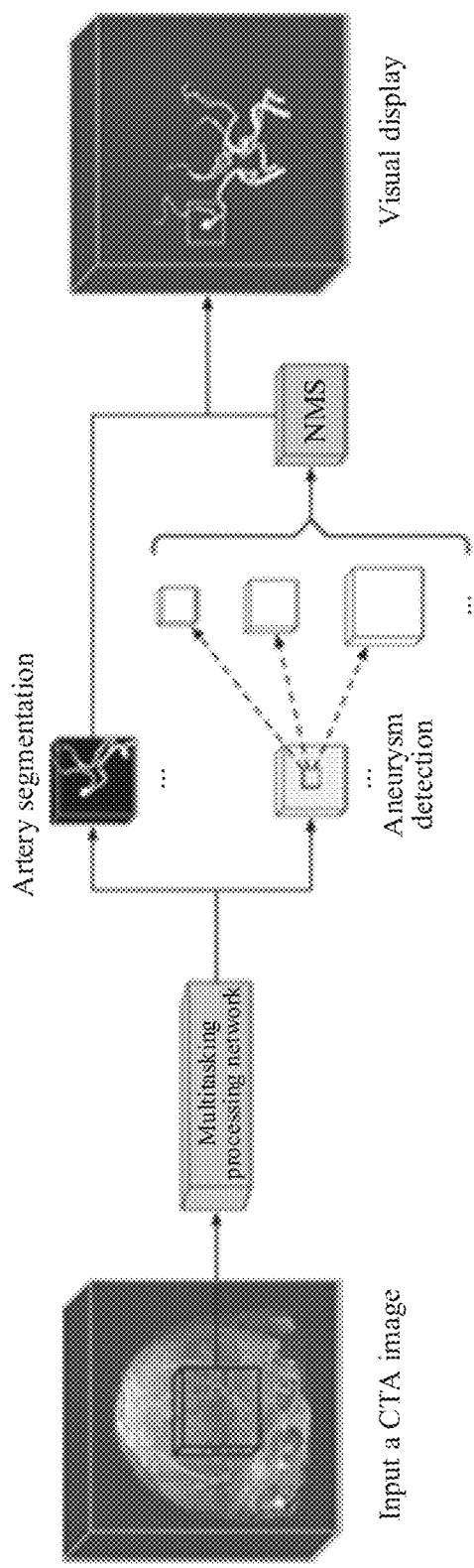
FIG. 2 is an overall schematic flowchart of a multitasking processing method according to an embodiment of the present disclosure.

A process of performing multitasking processing by using the foregoing multitasking network may be referred to as a multitasking processing method. FIG. 2 is an overall schematic flowchart of a multitasking processing method according to an embodiment of the present disclosure. The method in FIG. 1 may be performed by one or more computing devices, for example, a PC, a server, a server cluster, or a cloud computing network device. Specifically, intracranial aneurysm detection by using the multitasking processing method is used as a specific embodiment in FIG. 2.

First, an inputted CTA image may be obtained. For example, an intracranial angiography image of a patient is obtained by using the CT device, and includes an artery feature and an aneurysm feature. The inputted CTA image (for example, with the size of 512*512*256) may be inputted into the multitasking processing network as a whole, or may be divided into a plurality of sub-images to be separately inputted into the multitasking processing network for processing, to reduce the size of an image that needs to be processed at a time, thereby reducing a calculation amount and increasing a calculation rate. This is not limited herein.

Two groups of task processing results may be outputted by using the multitasking processing network, including artery segmentation results outputted by a segmentation neural network and aneurysm detection results outputted by a detection neural network. According to the embodiments of the present disclosure, when the CTA image is divided into the plurality of sub-images for processing, for one CTA image, the segmentation neural network respectively outputs a plurality of artery segmentation results based on the plurality of sub-images, and may splice the plurality of artery segmentation results into an artery segmentation result corresponding to the entire CTA image according to position parameters of the sub-images in the CTA image.

The aneurysm detection result includes, for example, a parameter of a prediction box of the aneurysm and a prediction probability that the prediction box includes the aneurysm. According to the embodiments of the present disclosure, for each pixel in an input image, the detection neural network may output a parameter of a prediction box of the aneurysm corresponding to the pixel and a prediction probability that the prediction box includes the aneurysm. The parameter of the prediction box may include position coordinates of a central point of the prediction box (that is, position coordinates of the pixel in the input image) and a size (for example, a side length) of the prediction box. For a plurality of detection results outputted by the detection neural network, processing may be performed by using a non-maximum suppression (NMS) method, to obtain a final aneurysm candidate box.

According to the embodiments of the present disclosure, the medical image processing method may further include: displaying a candidate box on an image including the first feature, the candidate box including a prediction box of the second feature detected by using the detection neural network. For example, as shown in FIG. 2, based on the multitasking processing network, the aneurysm candidate box obtained through prediction can be visually displayed in an artery feature map obtained through segmentation, to fast and intuitively display the aneurysm detected in the CTA image.

It is to be noted that only the artery feature and the aneurysm feature are used as specific examples of the first feature and the second feature in FIG. 2, but this does not constitute a limitation to the method in the present disclosure. The method may be further used to process other types of features. For example, the second feature may alternatively be the arterial vessel wall calcification feature or the arterial vessel occlusion feature described above. The first feature may be a vein feature, a bone feature, or the like, and examples are not listed herein.

Figure 3:
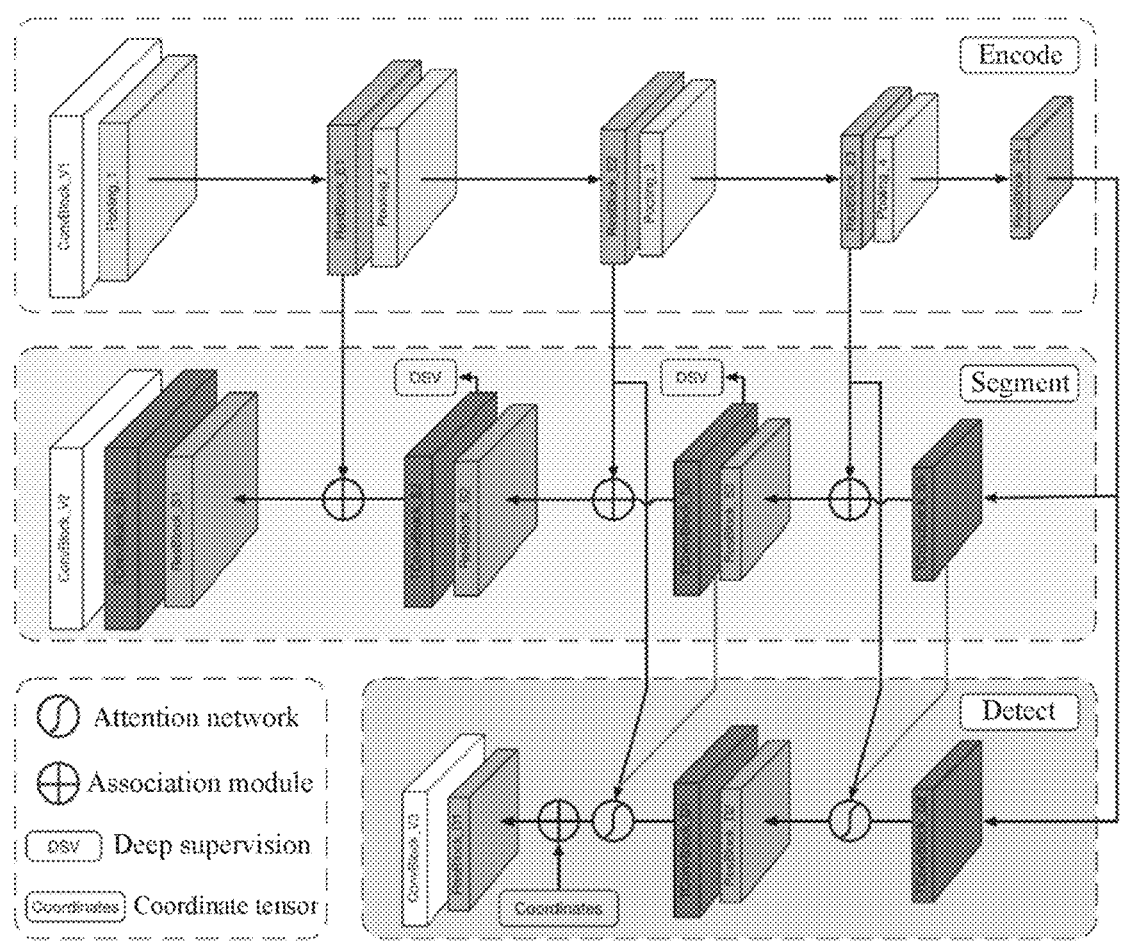
FIG. 3 is a schematic diagram of an overall structure of a multitasking processing network according to an embodiment of the present disclosure.

FIG. 3 is a schematic diagram of an overall structure of a multitasking processing network according to an embodiment of the present disclosure. The medical image processing method according to the present disclosure is described in detail below with reference to FIG. 3.

According to the embodiments of the present disclosure, the encoding neural network (Encoder) includes M processing layers, and the segmentation neural network (SegDecoder) includes M processing layers, M being a positive integer. In other words, the encoding neural network has the same quantity of processing layers as the segmentation neural network, so that the size of an image outputted by the segmentation neural network is the same as the size of an input image of the encoding neural network.

According to the embodiments of the present disclosure, the processing layer includes at least one of a convolution network, a transposed convolutional network, and a pooling layer. Specific network structures of the processing layers of the encoding neural network and the segmentation neural network may be the same or different, and are deployed according to actual application requirements. The structure shown in FIG. 3 is merely an exemplary structure, and some processing structures may be further added or reduced according to actual application requirements.

According to the embodiments of the present disclosure, the processing the medical image by using an encoding neural network includes: processing the medical image by using a first processing layer of the encoding neural network, to output a first encoded intermediate image; and processing, by using an $(m1)^{th}$ processing layer of the encoding neural network, an $(m1-1)^{th}$ encoded intermediate image outputted by an $(m1-1)^{th}$ processing layer of the encoding neural network, to output an $(m1)^{th}$ encoded intermediate image, m1 being a positive integer, and m1 being greater than 1 and less than or equal to M.

As shown in FIG. 3, the encoding neural network may include four processing layers. That is, M=4. Each processing layer in the encoding neural network may be formed by a pooling layer and a residual block (ResBlock). The pooling layer is configured to reduce an image size, and a residual block in each processing layer may be formed by one or more convolution networks, a normalization function, and an activation function. It is to be noted that the specific structures of the residual blocks may be the same or different. This is not limited herein. In addition, as shown in FIG. 3, the first processing layer may further include a 3D convolution network block represented by ConvBlock_V1. Specifically, the 3D convolution network block may be formed by a convolution network, a normalization (for example, batch normalization) function, and an activation function (for example, a rectified linear unit (ReLU)), and is configured to preliminarily process the input image. The processing layer is configured to extract a feature and output a feature map, that is, an encoded intermediate image.

After being inputted to the encoding neural network, the medical image may be first processed by the ConvBlock_V1 of the first processing layer, and then processed by a pooling layer (Pooling_1) and a residual block (ResBlock_E1) of the first processing layer, to output a first encoded intermediate image. Next, the first encoded intermediate image outputted by the first processing layer of the encoding neural network is processed by using an $(m1=2)^{th}$ processing layer (including a Pooling_2 and a ResBlock_E2) of the encoding neural network, to output a second encoded intermediate image, and so on Therefore, four encoded intermediate images may be generated by using the encoding neural network in FIG. 3, and each encoded intermediate image represents a feature map with a different size.

According to the embodiments of the present disclosure, the processing the encoded intermediate image by using the segmentation neural network, to segment the image according to a first feature and generate a segmented intermediate image includes: processing an $M^{th}$ encoded intermediate image outputted by the $M^{th}$ processing layer of the encoding neural network by using a first processing layer of the segmentation neural network, to output a first segmented intermediate image; processing, by using an $(m2)^{th}$ processing layer of the segmentation neural network, an $(m2-1)^{th}$ segmented intermediate image outputted by an $(m2-1)^{th}$ processing layer of the segmentation neural network and an $(M-m2+1)^{th}$ encoded intermediate image outputted by an $(M-m2+1)^{th}$ processing layer of the encoding neural network, to output an $(m2)^{th}$ segmented intermediate image, m2 being a positive integer, and m2 being greater than 1 and less than or equal to M; and processing, by using the convolution network, an $M^{th}$ segmented intermediate image outputted by an $M^{th}$ processing layer of the segmentation neural network, to generate a segmentation result of the first feature.

As shown in FIG. 3, the segmentation neural network includes M=4 processing layers. Specifically, the first processing layer may include a transposed convolutional network (TConvBlock_S4) that receives a fourth encoded intermediate image outputted by a fourth processing layer of the encoding neural network, and outputs the first segmented intermediate image. Compared with the pooling layer, the transposed convolutional network may be configured to process the inputted feature map and increase the image size. Then, a second (m2=2) processing layer of the segmentation neural network may include a transposed convolutional network (represented by TConvBlock_S3), a residual block (ResBlock_S3), and an association module. Specifically, the second processing layer may receive the first (m2−1=1) segmented intermediate image and a third (M-m2+1=3) encoded intermediate image of the encoding neural network, and the association module performs channel concatenation on the first segmented intermediate image and the third encoded intermediate image to obtain a concatenated image. The first segmented intermediate image and the third encoded intermediate image have the same image size. For example, for intermediate images with the size of a*b*c, the concatenated image may be represented as a*b*2c. That is, two images are concatenated in to a concatenated image by increasing a quantity of channels, to form a concatenated image. This is different from a process of adding corresponding parameters of the two images. Then, the second processing layer may process the concatenated image and output a second segmented intermediate image. The processing procedure of another processing layer such as a third processing layer or a fourth processing layer in the segmentation neural network is similar to that of the second processing layer, and details are not described herein again.

A segmentation output result of the segmentation neural network shown in FIG. 3 may be expressed as $Q \in R^{W \times H \times D}$, $q_i \in Q$, i=1, ..., WHD, $0 \leq q_i \leq 1$, where W×H×D represents the size of the medical image inputted to the encoding neural network, that is, a quantity of pixels included in the medical image. $q_i$ represents a probability that an $i^{th}$ pixel in the medical image is an arterial vessel. In other words, the output result of the segmentation neural network is a probability that each pixel in the medical image is an arterial vessel, and is used as the segmentation result. For example, a pixel with $q_i$ greater than a preset threshold for segmentation is determined as an arterial vessel. The preset threshold for segmentation is not specifically limited herein, and may be dynamically set based on actual application.

As shown in FIG. 3, a deep supervision (DSV) mechanism is further applicable to the segmentation neural network, and is used for supervising the accuracy of an intermediate processing result of the segmentation neural network. A specific implementation method is described below with reference to training and processing.

According to the embodiments of the present disclosure, the detection neural network includes N processing layers, N being a positive integer. The processing the encoded intermediate image and the segmented intermediate image by using the detection neural network includes: processing, by using a first processing layer of the detection neural network, the $M^{th}$ encoded intermediate image outputted by the $M^{th}$ processing layer of the encoding neural network, to output a first detected intermediate image. According to the embodiments of the present disclosure, the processing the encoded intermediate image and the segmented intermediate image by using an attention network, to generate a detected intermediate input image may include: processing, by using the attention network, an $(n-1)^{th}$ detected intermediate image outputted by an $(n-1)^{th}$ processing layer of the detection neural network, the $(m1)^{th}$ encoded intermediate image outputted by the $(m1)^{th}$ processing layer of the encoding neural network, and the $(m2)^{th}$ segmented intermediate image outputted by the $(m2)^{th}$ processing layer of the segmentation neural network, to output an nth detected intermediate input image. The nth detected intermediate input image is then processed by using an nth processing layer of the detection neural network, to output an nth detected intermediate image. The $(m1)^{th}$ encoded intermediate image and the $(m2)^{th}$ segmented intermediate image have the same image size as the $(n-1)^{th}$ detected intermediate image, n being a positive integer, and n being greater than 1 and less than or equal to N.

As shown in FIG. 3, the detection neural network includes N=3 processing layers. Specifically, the first processing layer may include a transposed convolutional network (TConvBlock_D2) that receives a fourth encoded intermediate image outputted by a fourth processing layer of the encoding neural network, and outputs the first detected intermediate image. Compared with the pooling layer, the transposed convolutional network may be configured to process the inputted feature map and increase the image size. Then, a second (n=2) processing layer of the detection neural network may include a transposed convolutional network (represented by TConvBlock_D1), a residual block (ResBlock_D2), and an attention network (described below). Specifically, a first detected intermediate image outputted by the first (n−1=1) processing layer of the detection neural network, a third encoded intermediate image outputted by a third processing layer of the encoding neural network, and a first segmented intermediate image outputted by a first processing layer of the segmentation neural network may be processed by using the attention network, to output a second detected intermediate input image. The second detected intermediate input image is processed by using the TConvBlock_D1 and the ResBlock_D2 in the second processing layer of the detection neural network, to output a second detected intermediate image. The third encoded intermediate image and the first segmented intermediate image have the same image size as the first detected intermediate image. A third processing layer in the segmentation neural network includes a 3D convolution network block represented by ConvBlock_V3, a residual block (ResBlock_D1), and an attention network. The ConvBlock_V3 may adopt a network structure of a region proposal network (RPN) in R-CNN, to output a detection result of an aneurysm feature, that is, a parameter of a prediction box and a probability, which are described below.

According to the embodiments of the present disclosure, for example, as shown in FIG. 3, a coordinate tensor mechanism may be further introduced into the detection neural network. In the inputted medical image, for pixels with different coordinate values, corresponding probabilities that the pixels have the second feature, that is, the aneurysm feature are different. For example, a probability of a pixel located at an image edge is less than a probability of a pixel located at an image center. The coordinate tensor mechanism is to introduce the foregoing different spatial probabilities caused by the position coordinates into the processing procedure of the detection neural network, for example, in a manner of setting position coordinate weights, so as to further improve the accuracy of the detection result.

According to the embodiments of the present disclosure, the outputting an nth detected intermediate input image by using the attention network includes: performing channel concatenation on the $(m1)^{th}$ encoded intermediate image and the $(n-1)^{th}$ detected intermediate image to obtain a concatenated image; adding the concatenated image and the $(m2)^{th}$ segmented intermediate image to obtain an added image; processing the added image by using an activation function to obtain an attention feature map; multiplying the attention feature map by the concatenated image to obtain an attention-enhanced image; and adding the attention-enhanced image and the concatenated image to obtain the nth detected intermediate input image.

Figure 4:
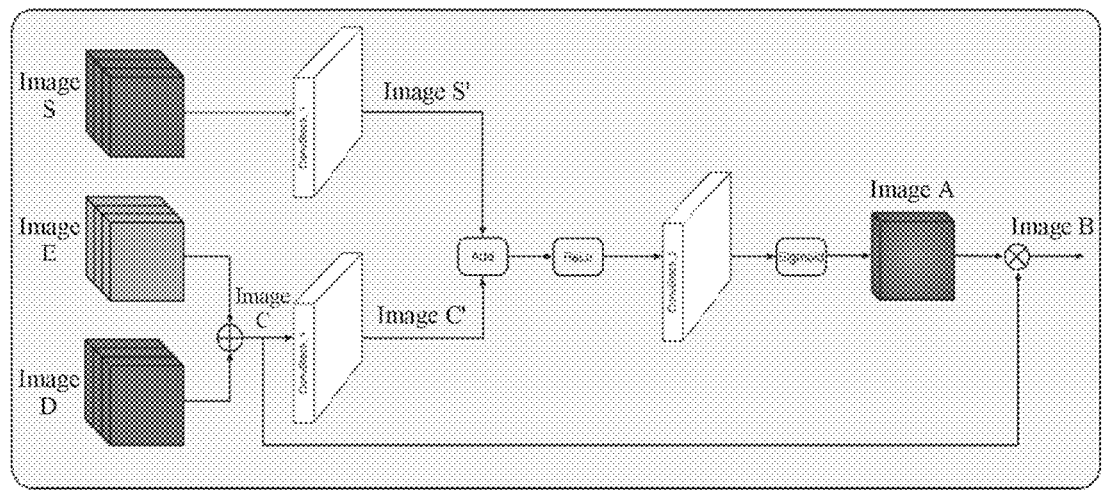
FIG. 4 is a schematic structural diagram of an attention network according to an embodiment of the present disclosure.

FIG. 4 is a schematic structural diagram of an attention network according to an embodiment of the present disclosure. As shown in FIG. 4, inputs of the attention network include a detected intermediate image (represented by an image D) outputted by a detection neural network, an encoded intermediate image (represented by an image E) outputted by an encoding neural network, and a segmented intermediate image (represented by an image S) outputted by a segmentation neural network. First, channel concatenation is performed on the image E and the image D to obtain a concatenated image. The processing procedure of the concatenated image is described above, and details are not repeated herein again. Then, to reduce a calculation amount, both the image C and the image S are processed by using a 1×1×1 convolution network (represented by ConvBlock_1), to reduce an image dimension, that is, to reduce an image size. The dimension-reduced images are respectively represented by an image C' and an image S'. It is to be noted that the foregoing convolution network for reducing the image size may be disposed according to a specific image size. For example, when sizes of the image C and the image S are relatively small, the foregoing step may be omitted. Then, the image C' is added to the image S' to obtain an added image, and the added image is processed by using an activation function (represented by ReLu) to obtain an attention feature map, that is, an image A. In addition, as shown in FIG. 4, another 1×1×1 convolution network (represented by ConvBlock_2) may be further disposed in the attention network, to further reduce the image dimension, for example, to one dimension, that is, an image including only one channel. Another activation function (represented by Sigmoid) may be further included in the attention network, to normalize a value of the image A to between 0 and 1. Then, the image A is multiplied by the image C to obtain an attention-enhanced image, that is, an image B. The multiplication may be expressed as $B = C \otimes A$, where $\otimes$ indicates that each channel of the image A is multiplied by each channel of the image C. Then, the image B may be further added to the image C to obtain a detected intermediate input image, which is expressed as $O = C + C \otimes A$.

The attention network shown in FIG. 4 enables the segmented intermediate image outputted by a processing layer of the segmentation neural network to be introduced into a processed image of the detection neural network, and an arterial vessel feature in the detection neural network is enhanced by using a feature map of the segmentation neural network for segmenting an artery feature as attention, which may be referred to as an attention mechanism. The attention mechanism is inspired from a human visual process. When reading, humans pay attention to only a prominent part of an entire visual area but ignore interference of other parts. The attention mechanism is added to the detection neural network, so that attention is paid to the arterial vessel feature while a task of detecting an aneurysm is performed. That is, the prominence of an arterial vessel in a feature map of the detection task is improved. The detection neural network including the foregoing attention network may be equivalent to introducing medical prior knowledge of the presence of the aneurysm on an artery into the processing procedure of the neural network, so that a processing task of detection more focuses on the artery feature, and consequently attention to a nonarterial feature such as noise is reduced, thereby improving the accuracy of a detection result.

The size of the aneurysm to be detected by the detection neural network shown in FIG. 3 may vary from 2 to 70 mm. Therefore, aneurysms with different sizes may be respectively detected by presetting a plurality of prediction boxes with different sizes. For example, sizes corresponding to prediction boxes of 2.5 mm, 5 mm, 10 mm, 15 mm, and 30 mm may be set respectively. For an inputted CTA image (for example, W=H=D=128) represented by $\chi \in R^{W \times H \times D}$, a detection output result of the detection neural network may be expressed as $\mathcal{O} \in R^{\tilde{W} \times \tilde{H} \times \tilde{D} \times A \times M}$ where $\tilde{W}=\tilde{H}=\tilde{D}=32$, A=5 represents a quantity of anchors, and M=5 represents a quantity of parameters corresponding to a center (expressed as an anchor) of each prediction box. For example, for each CTA image with the size of $128^3$, the detection neural network may output a detection output result $\mathcal{O}$ including $32^3$ data points, each data point corresponds to one pixel position in $\chi$, prediction data of five anchors is outputted at the each data point, and each anchor includes five parameters of $(p_i, t_x, t_y, t_z, t_b)$, where $p_i$ represents a probability that an aneurysm is included at the pixel position, and the foregoing $t_x, t_y, t_z, t_b$ represent parameters of prediction boxes. Specifically, $t_x, t_y, t_z$ represents a relative positional parameter of the pixel position in the input image, $t_b$ represents a relative size parameter of the prediction box, and the relative size is related to a side length of the prediction box.

It is to be noted that the multitasking processing network shown in FIG. 3 detects only the aneurysm feature. By changing a setting of the foregoing ConvBlock_V3 network and corresponding training data, the foregoing detection task may be extended to simultaneous detection of a plurality of cerebrovascular diseases such as arterial wall calcification. This is not limited herein.

The foregoing multitasking processing method and multitasking processing network described with reference to FIG. 2 and FIG. 3 can improve the prediction accuracy of a prediction task by using prior knowledge between related tasks. The multitasking method is widely applied to computer vision (CV) and natural language processing, and the multitasking processing can achieve a better processing effect than singletasking processing. The multitasking processing method includes two forms: hard parameter sharing and soft parameter sharing. In the form of hard parameter sharing, different tasks share part of a network, but each task has a respective branch network to independently generate an output. The soft parameter sharing means that each task has a respective independent and complete network, but there are a connection and an interaction between networks to perform corresponding constraints or selectively share the intermediate feature map. In the soft parameter sharing, performance degradation caused by forced sharing when a correlation between the tasks is not strong can be avoided, but each task has an independent and complete network, thereby greatly increasing a quantity of model parameters and a calculation mount. In the form of hard parameter sharing, part of the same network may be shared between different tasks to reduce the redundancy of the network, and a stronger correlation between a plurality of tasks is required.

According to the embodiments of the present disclosure, the multitasking includes the detection task performed by the detection neural network and a segmentation task performed by the segmentation neural network. By using a correlation between the segmentation task and the detection task, the detection neural network and the segmentation neural network share the structure of the encoding neural network, and respectively generate a detection output result and a segmentation output result. By using the multitasking processing network in the form of hard parameter sharing, a vessel feature extracted by the encoding neural network is enhanced while reducing the overall network complexity, thereby improving the detection accuracy of the detection neural network.

The medical image processing method according to the present disclosure may further include a training step, that is, optimizing a parameter of the multitasking processing network. The training step includes: training the segmentation neural network and the encoding neural network according to a Deiss loss function and a cross-entropy loss function; and training the detection neural network and the encoding neural network according to a classification loss function and a regression loss function.

According to the embodiments of the present disclosure, the training the segmentation neural network and the encoding neural network according to a Deiss loss function and a cross-entropy loss function includes: calculating a Deiss loss value according to the Deiss loss function based on a real segmentation label and a segmentation label of the first feature outputted by the segmentation neural network; calculating a cross-entropy loss value according to the cross-entropy loss function based on the real segmentation label and the segmentation label of the first feature outputted by the segmentation neural network; and performing training according to a preset threshold based on the Deiss loss value and the cross-entropy loss value, the Deiss loss function $\mathcal{L}_{dice}$ and the cross-entropy loss function $\mathcal{L}_{ce}$ being respectively expressed as:

$$\mathcal{L}_{dice} = 1 - \frac{2\Sigma_i s_i \times q_i}{\Sigma_i s_i + \Sigma_i q_i}$$

$$\mathcal{L}_{ce} = -\frac{1}{V} \sum_i (s_i \times \log(q_i) + (1 - s_i) \times \log(1 - q_i))$$

$s_i$ representing a real segmentation label of an $i^{th}$ pixel in the medical image, $q_i$ representing a prediction segmentation label of the $i^{th}$ pixel outputted by the segmentation neural network, and V representing a total quantity of pixels included in the medical image. A summation function refers to obtaining a sum of processing results of pixels in a training image, and log is a natural logarithmic function.

During training, a real segmentation label of an artery feature included in a training image is known, and is represented by $s_i \in L_s$, i=1, ..., W*H*D. A value of $s_i$ may be 0 or 1, where $s_i$=1 indicates that the pixel i is an arterial vessel, $s_i$=0 indicates that the pixel i is not an arterial vessel, and W*H*D represents a quantity of pixels included in the training image. The foregoing $L_s$ may be used as the real segmentation label of the training image to verify the accuracy of $\in R^{W \times H \times D}$ outputted by the segmentation neural network.

According to the embodiments of the present disclosure, the performing training according to a preset threshold based on the Deiss loss value and the cross-entropy loss value includes: performing training based on the Deiss loss value when the cross-entropy loss value is less than the preset threshold; and performing training based on the cross-entropy loss value when the cross-entropy loss value is not less than the preset threshold. In each forward propagation, two values of $\mathcal{L}_{dice}$ and $\mathcal{L}_{ce}$ may be calculated according to the foregoing formula. If $\mathcal{L}_{ce}$ is less than a preset threshold g, the network is trained by using the value $\mathcal{L}_{dice}$; otherwise, the network is trained by using the value $\mathcal{L}_{ce}$, which may be specifically expressed as the following formula:

$$\mathcal{L}_{seg} = \begin{cases} \mathcal{L}_{dice}, & \text{if } \mathcal{L}_{ce} < g \\ \mathcal{L}_{ce}, & \text{otherwise} \end{cases}$$

where $\mathcal{L}_{seg}$ represents a segmentation loss function.

According to the embodiments of the present disclosure, the segmentation neural network includes M processing layers, and the training the segmentation neural network and the encoding neural network according to a Deiss loss function and a cross-entropy loss function further includes: calculating an intermediate Deiss loss value according to the Deiss loss function based on the real segmentation label and a segmentation label of a first feature outputted by an $m^{th}$ processing layer of the segmentation neural network; calculating an intermediate cross-entropy loss value according to the cross-entropy loss function based on the real segmentation label and the segmentation label of the first feature outputted by the $m^{th}$ processing layer of the segmentation neural network; and performing training according to the preset threshold based on the intermediate Deiss loss value and the intermediate cross-entropy loss value, m and M being positive integers, and m being greater than 1 and less than M.

A structure of the segmentation neural network including M processing layers is shown in FIG. 3, where segmented intermediate results generated by a second processing layer and a third processing layer may be represented by $A_2$ and $A_3$. During training, the foregoing segmented intermediate results may be represented by $A_2$ and $A_3$. Loss values thereof may be respectively calculated according to $\mathcal{L}_{dice}$ and $\mathcal{L}_{ce}$ functions, and are used for training the network together with the loss value calculated based on the detection result Q. This is expressed as:

$$\mathcal{L}_{seg\_total} = \varepsilon_0 \times \mathcal{L}_{seg}(Q, L_s) + \Sigma_{i=1}^{2} \varepsilon_i \mathcal{L}_{seg}(A_i, L_s)$$

where $\mathcal{L}_{seg\_total}$ represents a total of segmentation functions of the segmentation neural network, and is a weighted sum of loss values between Q and $A_i$ outputted based on the segmentation neural network and the real segmentation label $L_s$, for example, $\varepsilon_0 = 0.7$, $\varepsilon_3 = 0.2$, $\varepsilon_2 = 0.1$.

The foregoing manner of calculating the loss values based on the segmented intermediate results and training the segmentation neural network may be referred to as the foregoing DSV mechanism. In this manner, the supervision for intermediate processing during training can be enhanced, and the training effect of, for example, a neural network with many layers of networks can be improved.

According to the embodiments of the present disclosure, the training the detection neural network and the encoding neural network according to a classification loss function and a regression loss function includes: processing a training sample by using the encoding neural network, the segmentation neural network, and the detection neural network, to obtain a detection result, the parameter of the prediction box including position coordinates of a central point of the prediction box and the size of the prediction box; calculating a classification loss value according to the classification loss function based on the prediction probability, and calculating a regression loss value according to the regression loss function based on the parameter of the prediction box and a parameter of a real box of the second feature; and performing training based on the classification loss value and the regression loss value.

According to the embodiments of the present disclosure, the training sample used in the foregoing training process may be the foregoing preprocessed CTA image, or may be a training sample that is sampled based on the CTA image and that is more conducive to training.

According to the embodiments of the present disclosure, the obtaining the training sample may include: the training the detection neural network and the encoding neural network according to a classification loss function and a regression loss function further includes: performing sampling in the medical image to obtain at least one training sample; calculating an area ratio of a bounding box of the at least one training sample to a bounding box of the second feature; and determining a training sample with the area ratio greater than a first threshold as a positive training sample, and determining a training sample with the area ratio less than a second threshold as a negative training sample, the positive training sample being used for training a classification loss and a regression loss, and the negative training sample being used for training the classification loss.

In an example, the area ratio may be calculated by using an intersection over union (IoU) function, and the IoU function refers to calculating a ratio of an intersection between two bounding boxes to a union between the two bounding boxes. For example, a training sample with an area ratio greater than 0.5 may be determined as a positive training sample, a training sample with an area ratio less than 0.02 may be determined as a negative training sample, and a classification loss and a regression loss may be respectively determined based on the positive training sample and the negative training sample. For example, the positive training sample is used for training the classification loss and the regression loss, and the negative training sample is used for training the classification loss.

During training, to maintain a proper ratio of the positive training samples to the negative training samples, the following sampling policy may be used: For a CTA image including a real candidate box (ground truth), the real candidate box corresponds to the bounding box of the second feature described above, and sampling may be performed within a specific pixel offset range near a center point of the real candidate box of the CTA image, to obtain training sample images with different sizes, thereby ensuring that each real candidate box in the CTA image is included in the training sample during training. In addition, sampling may be further randomly performed in the CTA image, so that sampled training samples generally do not include the foregoing real candidate box. The area ratio may be calculated according to the foregoing IoU function based on the foregoing sampled training samples, to divide the obtained training samples into the positive training samples and the negative training samples.

According to the embodiments of the present disclosure, a positive training sample set $S_{pos}$ and a negative training sample set $S_{neg}$ may be obtained in the foregoing manner. In a real CTA image, a quantity of obtained negative training samples may be far greater than a quantity of positive training samples. To avoid that the quantity of positive training samples and the quantity of negative training samples are unbalanced, some subsets may be selected from the negative training sample set as the training samples. For example, some negative training samples that are difficult to be distinguished from the negative sample set $S_{neg}$ may be selected to form a difficult negative training sample set represented by $S_{hard}$, where $S_{hard} \subseteq S_{neg}$.

The classification loss function and the regression loss function used for training the detection neural network and the encoding neural network are described below in detail.

The classification loss function is used for representing the accuracy of the detection result in a predicted probability value. In an example, the classification loss function may be expressed as:

$$\mathcal{L}_{cls}(p) = -\frac{\xi_1}{|S_{pos}|}\sum_{i \in S_{pos}} \log(p_i) - \frac{\xi_2}{|S_{hard}|}\sum_{i \in S_{hard}} \log(1-p_i)$$

where $\mathcal{L}_{cls}$ represents the classification loss function, positive and negative training sample weight coefficients $\xi_1 = \xi_2 = 0.5$, and $\Sigma_{i \in S_{pos}} \log(p_i)$ refer to obtaining a sum of processing results obtained based on the processing of training samples in $S_{pos}$. $\Sigma_{i \in S_{hard}} \log(1-p_i)$ refers to obtaining a sum of processing results obtained based on the processing of training samples in $S_{hard}$. $|\cdot|$ represents a quantity of training samples in a corresponding set.

The regression loss function is used for representing the accuracy of the detection result in a predicted parameter value of a prediction box. In an example, the regression loss function (a Smooth L1 loss function) may be expressed as:

$$\mathcal{L}_{loc}(t,v) = \sum_{t \in S_{pos}} \sum_{k \in \{x,y,z,b\}} Smooth_{L1}(t_k - v_k)$$

$$Smooth_{L1}(x) = \begin{cases} 0.5x^2, & |x| < 1, \\ |x| - 0.5, & \text{otherwise} \end{cases}$$

where $\mathcal{L}_{loc}$ represents the regression loss function, and $t \in S_{pos}$ indicates that calculation is performed on only a positive sample. $(v_x, v_y, v_z, v_b)$ represents a coordinate parameter of the real candidate box.

Therefore, an overall loss function of the foregoing multitasking processing network may be expressed as:

$$\mathcal{L}_{total} = \mathcal{L}_{cls} + \mathcal{L}_{loc} + \alpha \mathcal{L}_{seg\_total}$$

where $\alpha$ is a weighted constant.

According to the embodiments of the present disclosure, the multitasking processing network may alternatively be trained by using another training function. For example, the multitasking processing network may alternatively be trained by using a stochastic gradient descent (SGD) method. For the SGD method, specifically, a parameter thereof may be set, where momentum may be 0.9, weight decay may be 1e-4, including training 200 AI training epochs. An initial learning rate is 1e-2, and is decreased to 0.1 of the original after 100 epochs.

The structure of the multitasking processing network is used in the AI-based medical image processing method according to the present disclosure. The inputted medical image is processed by using the encoding neural network to generate an encoded intermediate image; the encoded intermediate image is processed by using the segmentation neural network, to segment a first feature and generate a segmented intermediate image; and the encoded intermediate image and the segmented intermediate image are processed by using the detection neural network, to detect a second feature included in the first feature and output a detection result of the second feature. Due to the second feature included in the first feature, the segmentation task and the detection task have a task correlation. The foregoing detection neural network and segmentation neural network having the task correlation share the processing result of the encoding neural network in the form of hard parameter sharing, to enhance the first feature processed in the detection task, thereby improving the accuracy of the detection result. In addition, an attention mechanism is further introduced into the detection neural network, to enhance the attention of the detection neural network to the first feature, thereby further improving the accuracy of the detection result.

Figure 5:
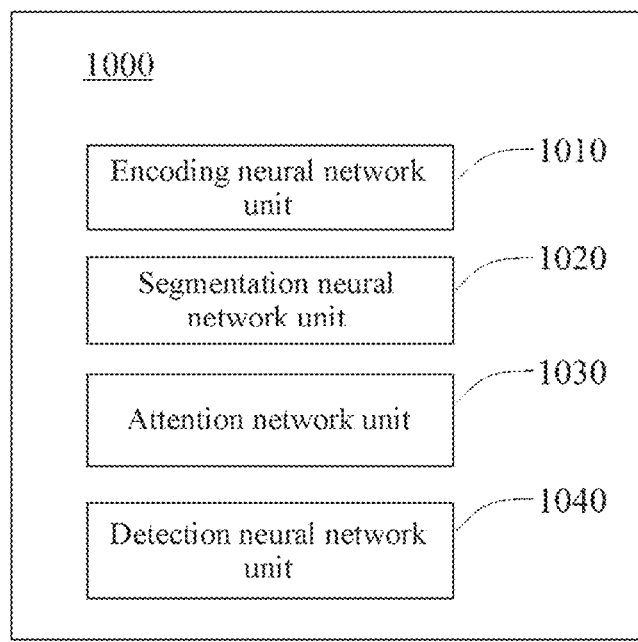
FIG. 5 is a schematic block diagram of an AI-based medical image processing apparatus according to an embodiment of the present disclosure.

The present disclosure further provides an AI-based medical image processing apparatus. FIG. 5 is a schematic block diagram of an AI-based medical image processing apparatus according to an embodiment of the present disclosure. As shown in FIG. 5, the apparatus 1000 may include an encoding neural network unit 1010, a segmentation neural network unit 1020, an attention network unit 1030, and a detection neural network unit 1040.

According to the embodiments of the present disclosure, the encoding neural network unit 1010 is configured to process a medical image to generate an encoded intermediate image. The segmentation neural network unit 1020 is configured to process the encoded intermediate image, and segment the encoded intermediate image according to a first feature, to generate a segmented intermediate image including the first feature. The attention network unit 1030 is configured to process the encoded intermediate image and the segmented intermediate image, to generate a detected intermediate input image. The detection neural network unit 1040 is configured to process the detected intermediate input image, to detect whether an image region of the detected intermediate input image in which the first feature is located includes a second feature.

According to the embodiments of the present disclosure, the encoding neural network unit 1010 includes M processing layers, and the segmentation neural network unit 1020 includes M processing layers, M being a positive integer. The processing layer includes at least one of a convolution network, a transposed convolutional network, and a pooling layer. A first processing layer of the encoding neural network unit 1010 processes the medical image, to output a first encoded intermediate image. Then, an $(m1)^{th}$ processing layer of the encoding neural network unit 1010 processes an $(m1-1)^{th}$ encoded intermediate image outputted by an $(m1-1)^{th}$ processing layer of the encoding neural network unit 1010, to output an $(m1)^{th}$ encoded intermediate image, m1 being a positive integer, and m1 being greater than 1 and less than or equal to M. A first processing layer of the segmentation neural network unit 1020 processes an $M^{th}$ encoded intermediate image outputted by the $M^{th}$ processing layer of the encoding neural network unit 1010, to output a first segmented intermediate image. An $(m2)^{th}$ processing layer of the segmentation neural network unit 1020 processes an $(m2-1)^{th}$ segmented intermediate image outputted by an $(m2-1)^{th}$ processing layer of the segmentation neural network unit 1020 and an (M−m2+1)$^{th}$ encoded intermediate image outputted by an (M−m2+1)$^{th}$ processing layer of the encoding neural network unit 1010, to output an (m2)$^{th}$ segmented intermediate image, m2 being a positive integer, and m2 being greater than 1 and less than or equal to M. Then, an M$^{th}$ segmented intermediate image outputted by an M$^{th}$ processing layer of the segmentation neural network unit 1020 is processed, to generate a segmentation result of the first feature.

According to the embodiments of the present disclosure, the detection neural network unit 1040 includes N processing layers, N being a positive integer. A first processing layer of the detection neural network unit 1040 processes the M$^{th}$ encoded intermediate image outputted by the M$^{th}$ processing layer of the encoding neural network unit 1010, to output a first detected intermediate image. According to the embodiments of the present disclosure, the attention network unit 1030 processes an (n−1)$^{th}$ detected intermediate image outputted by an (n−1)$^{th}$ processing layer of the detection neural network unit 1040, an (m1)$^{th}$ encoded intermediate image outputted by an (m1)$^{th}$ processing layer of the encoding neural network unit 1010, and an (m2)$^{th}$ segmented intermediate image outputted by an (m2)$^{th}$ processing layer of the segmentation neural network unit 1020, to output an nth detected intermediate input image. An nth processing layer of the detection neural network unit 1040 processes the nth detected intermediate input image, to output an nth detected intermediate image. The (m1)$^{th}$ encoded intermediate image and the (m2)$^{th}$ segmented intermediate image have the same image size as the (n−1)$^{th}$ detected intermediate image, n being a positive integer, and n being greater than 1 and less than or equal to N.

According to the embodiments of the present disclosure, the attention network unit 1030 performs channel concatenation on the (m1)$^{th}$ encoded intermediate image and the (n−1)$^{th}$ detected intermediate image to obtain a concatenated image; adds the concatenated image and the (m2)$^{th}$ segmented intermediate image to obtain an added image; processes the added image by using an activation function to obtain an attention feature map; multiplies the attention feature map by the concatenated image to obtain an attention-enhanced image; and adds the attention-enhanced image and the serial image to obtain the nth detected intermediate input image.

0001According to the embodiments of the present disclosure, the medical image is a 3D image, and the encoding neural network unit 1010, the segmentation neural network unit 1020, and the detection neural network unit 1040 are 3D convolutional neural networks.

According to the embodiments of the present disclosure, the medical image is a CTA image, the first feature is an artery feature, and the second feature is at least one of an aneurysm feature, an arterial vessel wall calcification feature, and an arterial vessel occlusion feature.

According to the embodiments of the present disclosure, the detection neural network unit 1040 may output a detection result of the second feature, where the detection result includes a parameter of a prediction box of the second feature and a prediction probability that the prediction box includes the second feature. The medical image processing apparatus may further include a display unit, configured to display a candidate box on an image including the first feature, the candidate box including the prediction box of the second feature detected by using the detection neural network unit 1040.

According to the embodiments of the present disclosure, the medical image processing apparatus may further include a training unit. The training unit may be configured to: train the segmentation neural network unit 1020 and the encoding neural network unit 1010 according to a Deiss loss function and a cross-entropy loss function; and train the detection neural network unit 1040 and the encoding neural network unit 1010 according to a classification loss function and a regression loss function.

According to the embodiments of the present disclosure, the training, by the training unit, the segmentation neural network unit 1020 and the encoding neural network unit 1010 according to a Deiss loss function and a cross-entropy loss function includes: calculating a Deiss loss value according to the Deiss loss function based on a real segmentation label and a segmentation label of the first feature outputted by the segmentation neural network unit 1020; calculating a cross-entropy loss value according to the cross-entropy loss function based on the real segmentation label and the segmentation label of the first feature outputted by the segmentation neural network unit 1020; and performing training according to a preset threshold based on the Deiss loss value and the cross-entropy loss value, the Deiss loss function $\mathcal{L}_{dice}$ and the cross-entropy loss function $\mathcal{L}_{ce}$ being respectively expressed as:

$$\mathcal{L}_{dice} = 1 - \frac{2\Sigma_i s_i \times q_i}{\Sigma_i s_i + \Sigma_i q_i}$$

$$\mathcal{L}_{ce} = -\frac{1}{V}\sum_i (s_i \times \log(q_i) + (1 - s_i) \times \log(1 - q_i))$$

$s_i$ representing a real segmentation label of an i$^{th}$ pixel in the medical image, $q_i$ representing a prediction segmentation label of the i$^{th}$ pixel outputted by the segmentation neural network unit 1020, and V representing a total quantity of pixels included in the medical image.

According to the embodiments of the present disclosure, the performing, by the training unit, training according to a preset threshold based on the Deiss loss value and the cross-entropy loss value includes: performing training based on the Deiss loss value when the cross-entropy loss value is less than the preset threshold; and performing training based on the cross-entropy loss value when the cross-entropy loss value is not less than the preset threshold.

According to the embodiments of the present disclosure, the segmentation neural network unit 1040 may include M processing layers, and the training, by the training unit, the segmentation neural network unit 1020 and the encoding neural network unit 1010 according to a Deiss loss function and a cross-entropy loss function further includes: calculating an intermediate Deiss loss value according to the Deiss loss function based on the real segmentation label and a segmentation label of a first feature outputted by an m$^{th}$ processing layer of the segmentation neural network unit 1020; calculating an intermediate cross-entropy loss value according to the cross-entropy loss function based on the real segmentation label and the segmentation label of the first feature outputted by the m$^{th}$ processing layer of the segmentation neural network unit 1020; and performing training according to the preset threshold based on the intermediate Deiss loss value and the intermediate cross-entropy loss value, m and M being positive integers, and m being greater than 1 and less than M.

According to the embodiments of the present disclosure, the training the detection neural network unit 1040 and the encoding neural network unit 1010 according to a classification loss function and a regression loss function includes: processing a training sample by using the encoding neural network unit 1010, the segmentation neural network unit 1020, and the detection neural network unit 1040, to obtain a detection result, the parameter of the prediction box including position coordinates of a central point of the prediction box and the size of the prediction box; calculating a classification loss value according to the classification loss function based on the prediction probability, and calculating a regression loss value according to the regression loss function based on the parameter of the prediction box and a parameter of a real box of the second feature; and performing training based on the classification loss value and the regression loss value.

According to the embodiments of the present disclosure, the training the detection neural network unit 1040 and the encoding neural network unit 1010 according to a classification loss function and a regression loss function further includes: performing sampling in the medical image to obtain at least one training sample; calculating an area ratio of a bounding box of the at least one training sample to a bounding box of the second feature; and determining a training sample with the area ratio greater than a first threshold as a positive training sample, and determining a training sample with the area ratio less than a second threshold as a negative training sample, the positive training sample being used for training a classification loss and a regression loss, and the negative training sample being used for training the classification loss. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 6:
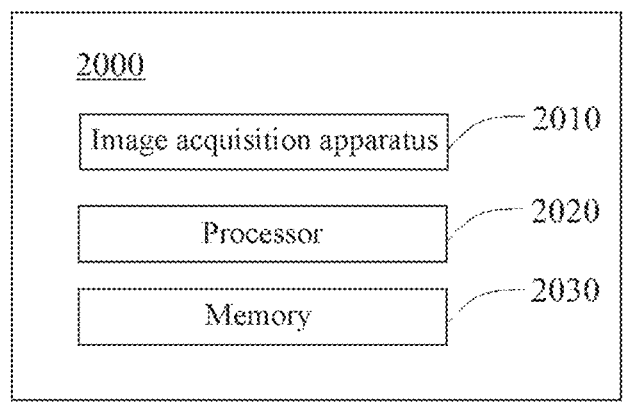
FIG. 6 is a schematic block diagram of an AI-based medical device according to an embodiment of the present disclosure.

According to still another aspect of the present disclosure, an AI-based medical device is further provided. FIG. 6 is a schematic block diagram of an AI-based medical device 2000 according to an embodiment of the present disclosure.

As shown in FIG. 6, the device 2000 may include an image acquisition apparatus 2010, a processor 2020, and a memory 2030. The memory 2030 stores computer-readable code. The computer-readable code, when run by the processor 2020, may perform the AI-based medical image processing method described above.

In a specific embodiment, the image acquisition apparatus 2010 may be a CT device, and obtains an intracranial arterial angiography image or the like as the medical image described above. Then, the processor 2020 may be connected to the image acquisition apparatus 2010 in a wired and/or wireless manner, to receive the foregoing medical image. The processor 2020 may then run the computer-readable code stored in the memory 2030, and the computer-readable code, when run by the processor 2020, may perform the AI-based medical image processing method described above, to obtain an artery segmentation result and an aneurysm detection result based on the medical image. In addition, the medical device 2000 may further include a display device such as a display screen, to display the artery segmentation result and the aneurysm detection result. For a display effect, reference may be made to that shown in FIG. 2.

Figure 7:
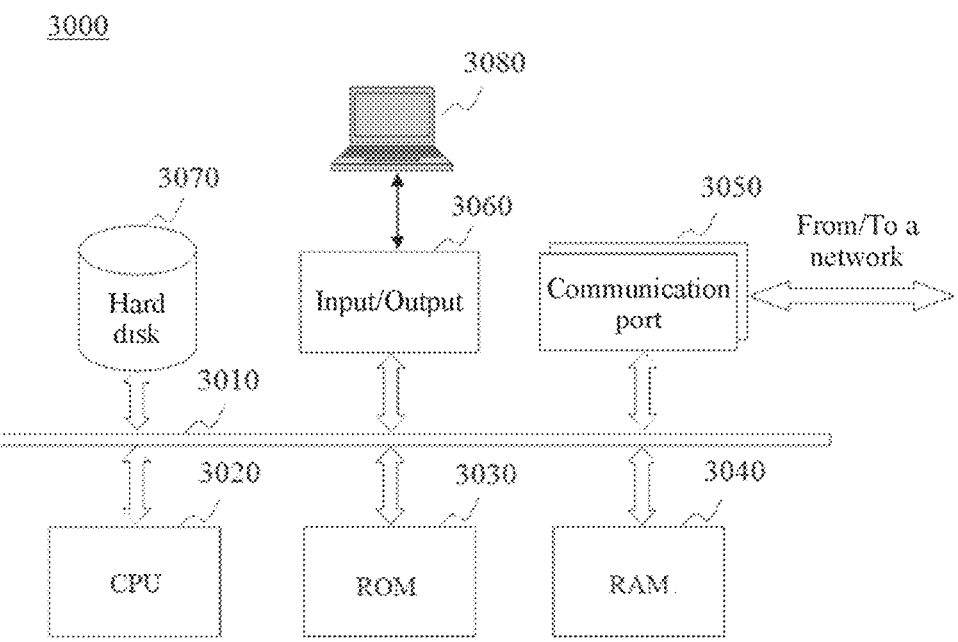
FIG. 7 is a schematic diagram of an architecture of an exemplary computing device according to an embodiment of the present disclosure.

The method or apparatus according to the embodiments of the present disclosure may alternatively be implemented by using an architecture of a computing device 3000 shown in FIG. 7. As shown in FIG. 7, the computing device 3000 may include a bus 3010, one or more CPUs 3020, a read-only memory (ROM) 3030, a random access memory (RAM) 3040, a communication port 3050 connected to a network, an input/output component 3060, a hard disk 3070, and the like. A storage device, for example, the ROM 3030 or the hard disk 3070, in the computing device 3000 may store various data or files used in processing and/or communication in the AI-based medical image processing method according to the present disclosure and program instructions executed by the CPU. The computing device 800 may further include a user interface 3080. Certainly, the architecture shown in FIG. 7 is merely exemplary, and when different devices are implemented, one or more components in the computing device shown in FIG. 7 may be omitted according to an actual requirement.

Figure 8:
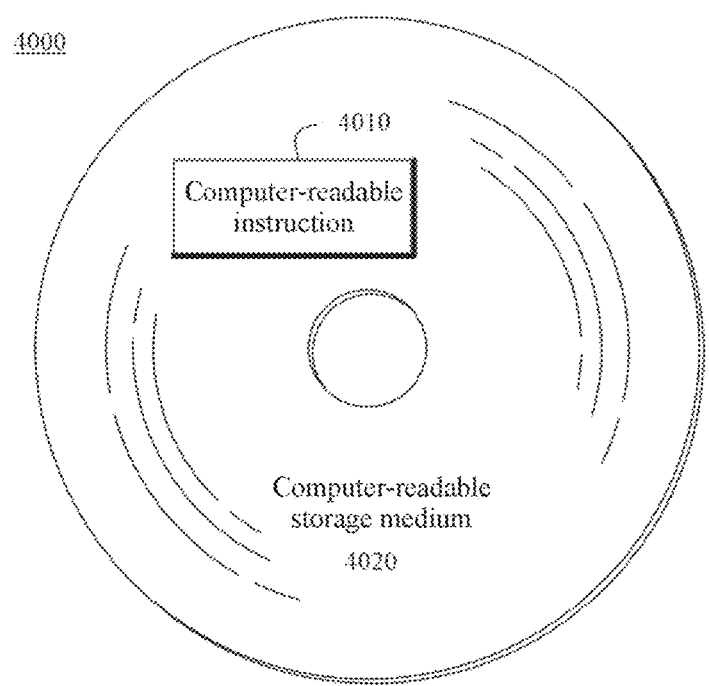
FIG. 8 is a schematic diagram of a computer storage medium according to an embodiment of the present disclosure.

According to still another aspect of the present disclosure, a computer-readable storage medium is further provided. FIG. 8 is a schematic diagram 4000 of a storage medium according to the present disclosure.

As shown in FIG. 8, the computer storage medium 4020 stores computer-readable instructions 4010. The computer-readable instructions 4010, when executed by a processor, may perform the AI-based medical image processing method according to the embodiments of the present disclosure described with reference to the foregoing accompanying drawings. The computer-readable storage medium includes, but is not limited to, a volatile memory and/or a non-volatile memory. For example, the volatile memory may include a RAM and/or a cache. For example, the non-volatile memory may include a ROM, a hard disk, and a flash memory. For example, the computer storage medium 4020 may be connected to a computing device such as a computer. Then, when running the computer-readable instructions 4010 stored in the computer storage medium 4020, the computing device may perform the foregoing AI-based medical image processing method according to the present disclosure.

A person skilled in the art can understand that, content disclosed in the present disclosure may have various variations and improvements. For example, the devices or components described above may be implemented by using hardware, or may be implemented by using software, firmware, or a combination of some of or all of the software, the firmware, and the hardware.

In addition, although the present disclosure makes various references to some units in the system according to the embodiments of the present disclosure, any quantity of different units may be used and run on a client and/or a server. The units are only illustrative, and different aspects of the system and method may use different units.

A person of ordinary skill in the art may understand that all or some of the steps in the foregoing method may be implemented by a program instructing relevant hardware. The program may be stored in a computer-readable storage medium, for example, a ROM, a magnetic disk, or an optical disc. Optionally, all or some of the steps in the foregoing embodiments may be alternatively implemented by using one or more integrated circuits. Correspondingly, the modules/units in the foregoing embodiments may be implemented in the form of hardware, or may be implemented in the form of a software functional module. The present disclosure is not limited to any specific form of combination of hardware and software.

Unless otherwise defined, all terms (including technical and scientific terms) used herein have the same meaning as commonly understood by one of ordinary skill in the art to which the present disclosure belongs. It is further to be understood that, the terms such as those defined in commonly used dictionaries are to be interpreted as having meanings that are consistent with the meanings in the context of the related art, and are not to be interpreted in an idealized or extremely formalized sense, unless expressly so defined herein.

The above is description of the present disclosure, and is not to be considered as a limitation to the present disclosure. Although several exemplary embodiments of the present disclosure are described, a person skilled in the art may easily understand that, many changes can be made to the exemplary embodiments without departing from novel teaching and advantages of the present disclosure. Therefore, the changes are intended to be included within the scope of the present disclosure as defined by the claims. It is to be understood that, the above is description of the present disclosure, and is not to be considered to be limited by the disclosed specific embodiments, and modifications to the disclosed embodiments and other embodiments fall within the scope of the appended claims. The present disclosure is subject to the claims and equivalents thereof

What is claimed is:

1. An artificial intelligence-based (AI-based) medical image processing method performed by a computing device, the method comprising:
    processing a medical image to generate an encoded intermediate image representing a structural feature of the medical image;
    segmenting the encoded intermediate image according to a first feature, to generate a segmented intermediate image including the first feature;
    processing the encoded intermediate image and the segmented intermediate image based on an attention mechanism, to generate an attention-enhanced detected intermediate input image; and
    performing second feature detection on the detected intermediate input image, to determine whether an image region of the detected intermediate input image in which the first feature is located comprises a second feature.

2. The medical image processing method according to claim 1, wherein the processing a medical image to generate an encoded intermediate image comprises:
    processing the medical image by using an encoding neural network to generate the encoded intermediate image, the encoding neural network comprising M processing layers, M being a positive integer, the processing layer comprising at least one of a convolution network, a transposed convolutional network, and a pooling layer;
    the processing the medical image by using an encoding neural network further comprises:
    processing the medical image by using a first processing layer of the encoding neural network, to output a first encoded intermediate image; and
    processing, by using an $(m1)^{th}$ processing layer of the encoding neural network, an $(m1-1)^{th}$ encoded intermediate image outputted by an $(m1-1)^{th}$ processing layer of the encoding neural network, to output an $(m1)^{th}$ encoded intermediate image, m1 being a positive integer, and m1 being greater than 1 and less than or equal to M; and the processing the encoded intermediate image, to segment a first feature and generate a segmented intermediate image further comprises:
    processing the encoded intermediate image by using a segmentation neural network, to segment the first feature and generate the segmented intermediate image, the segmentation neural network comprising M processing layers, an $M^{th}$ encoded intermediate image outputted by an $M^{th}$ processing layer of the encoding neural network being processed by using a first processing layer of the segmentation neural network, to output a first segmented intermediate image;
    processing, by using an $(m2)^{th}$ processing layer of the segmentation neural network, an $(m2-1)^{th}$ segmented intermediate image outputted by an $(m2-1)^{th}$ processing layer of the segmentation neural network and an $(M-m2+1)^{th}$ encoded intermediate image outputted by an $(M-m2+1)^{th}$ processing layer of the encoding neural network, to output an $(m2)^{th}$ segmented intermediate image, m2 being a positive integer, and m2 being greater than 1 and less than or equal to M; and
    processing, by using the convolution network, an $M^{th}$ segmented intermediate image outputted by an $M^{th}$ processing layer of the segmentation neural network, to generate a segmentation result of the first feature.

3. The medical image processing method according to claim 2, wherein the processing the detected intermediate input image, to detect a second feature comprised in the first feature comprises:
    processing the detected intermediate input image by using a detection neural network, to detect the second feature comprised in the first feature, the detection neural network comprising N processing layers, N being a positive integer,
    the $M^{th}$ encoded intermediate image outputted by the $M^{th}$ processing layer of the encoding neural network being processed by using a first processing layer of the detection neural network, to output a first detected intermediate image; and
    the processing the encoded intermediate image and the segmented intermediate image based on an attention mechanism, to generate a detected intermediate input image comprises:
    processing the encoded intermediate image and the segmented intermediate image based on the attention mechanism by using an attention network, to generate the detected intermediate input image;
    processing, by using the attention network, an $(n-1)^{th}$ detected intermediate image outputted by an $(n-1)^{th}$ processing layer of the detection neural network, the $(m1)^{th}$ encoded intermediate image outputted by the $(m1)^{th}$ processing layer of the encoding neural network, and the $(m2)^{th}$ segmented intermediate image outputted by the $(m2)^{th}$ processing layer of the segmentation neural network, to output an $n^{th}$ detected intermediate input image, and
    processing the $n^{th}$ detected intermediate input image by using an $n^{th}$ processing layer of the detection neural network, to output an $n^{th}$ detected intermediate image, the $(m1)^{th}$ encoded intermediate image and the $(m2)^{th}$ segmented intermediate image having the same image size as the $(n-1)^{th}$ detected intermediate image, n being a positive integer, and n being greater than 1 and less than or equal to N.

4. The medical image processing method according to claim 3, wherein the outputting an $n^{th}$ detected intermediate input image by using the attention network comprises:
  performing channel concatenation on the $(m1)^{th}$ encoded intermediate image and the $(n-1)^{th}$ detected intermediate image to obtain a concatenated image;
  adding the concatenated image and the $(m2)^{th}$ segmented intermediate image to obtain an added image;
  processing the added image by using an activation function to obtain an attention feature map;
  multiplying the attention feature map by the concatenated image to obtain an attention-enhanced image; and
  adding the attention-enhanced image and the concatenated image to obtain the $n^{th}$ detected intermediate input image.

5. The medical image processing method according to claim 1, wherein the medical image is a computed tomography angiography (CTA) image, the first feature is an artery feature, and the second feature is at least one of an aneurysm feature, an arterial vessel wall calcification feature, and an arterial vessel occlusion feature.

6. The medical image processing method according to claim 1, wherein the performing second feature detection on the detected intermediate input image comprises:
  outputting a detection result of the second feature, the detection result comprising: a parameter of a prediction box of the second feature and a prediction probability that the prediction box comprises the second feature; and the method further comprises:
  displaying a candidate box on an image including the first feature, the candidate box including the prediction box of the second feature detected by using the detection neural network.

7. The medical image processing method according to claim 2, further comprising:
  training the segmentation neural network and the encoding neural network according to a Deiss loss function and a cross-entropy loss function, the segmentation neural network and the encoding neural network being three-dimensional (3D) convolutional neural networks.

8. The medical image processing method according to claim 3, further comprising:
  training the detection neural network and the encoding neural network according to a classification loss function and a regression loss function, the detection neural network being a 3D convolutional neural network.

9. The medical image processing method according to claim 8, wherein the training the segmentation neural network and the encoding neural network according to a Deiss loss function and a cross-entropy loss function comprises:
  calculating a Deiss loss value according to the Deiss loss function based on a real segmentation label and a segmentation label of the first feature outputted by the segmentation neural network;
  calculating a cross-entropy loss value according to the cross-entropy loss function based on the real segmentation label and the segmentation label of the first feature outputted by the segmentation neural network; and
  performing training according to a preset threshold based on the Deiss loss value and the cross-entropy loss value,
  the Deiss loss function $\mathcal{L}_{dice}$ and the cross-entropy loss function $\mathcal{L}_{ce}$ being respectively expressed as:

$$\mathcal{L}_{dice} = 1 - \frac{2\Sigma_i s_i \times q_i}{\Sigma_i s_i + \Sigma_i q_i}$$

$$\mathcal{L}_{ce} = -\frac{1}{V} \sum_i (s_i \times \log(q_i) + (1 - s_i) \times \log(1 - q_i))$$

$s_i$ representing a real segmentation label of an $i^{th}$ pixel in the medical image, $q_i$ representing a prediction segmentation label of the $i^{th}$ pixel outputted by the segmentation neural network, and V representing a total quantity of pixels comprised in the medical image.

10. The medical image processing method according to claim 9, wherein the performing training according to a preset threshold based on the Deiss loss value and the cross-entropy loss value comprises:
  performing training based on the Deiss loss value when the cross-entropy loss value is less than the preset threshold; and
  performing training based on the cross-entropy loss value when the cross-entropy loss value is not less than the preset threshold.

11. The medical image processing method according to claim 8, wherein the segmentation neural network comprises M processing layers, and the training the segmentation neural network and the encoding neural network according to a Deiss loss function and a cross-entropy loss function further comprises:
  calculating an intermediate Deiss loss value according to the Deiss loss function based on the real segmentation label and a segmentation label of a first feature outputted by an $m^{th}$ processing layer of the segmentation neural network;
  calculating an intermediate cross-entropy loss value according to the cross-entropy loss function based on the real segmentation label and the segmentation label of the first feature outputted by the $m^{th}$ processing layer of the segmentation neural network; and
  performing training according to the preset threshold based on the intermediate Deiss loss value and the intermediate cross-entropy loss value,
  m and M being positive integers, and m being greater than 1 and less than M.

12. The medical image processing method according to claim 8, wherein the training the detection neural network and the encoding neural network according to a classification loss function and a regression loss function comprises:
  processing a training sample by using the encoding neural network, the segmentation neural network, and the detection neural network, to obtain a detection result, the parameter of the prediction box comprising position coordinates of a central point of the prediction box and the size of the prediction box;
  calculating a classification loss value according to the classification loss function based on the prediction probability, and calculating a regression loss value according to the regression loss function based on the parameter of the prediction box and a parameter of a real box of the second feature; and
  performing training based on the classification loss value and the regression loss value.

13. The medical image processing method according to claim 12, wherein the training the detection neural network and the encoding neural network according to a classification loss function and a regression loss function further comprises:

performing sampling in the medical image to obtain at least one training sample;

calculating an area ratio of a bounding box of the at least one training sample to a bounding box of the second feature; and determining a training sample with the area ratio greater than a first threshold as a positive training sample, and determining a training sample with the area ratio less than a second threshold as a negative training sample, the positive training sample being used for training a classification loss and a regression loss, and the negative training sample being used for training the classification loss.

14. A computing device, comprising:

an image acquisition apparatus, configured to obtain a medical image;

a processor; and a memory, storing computer-readable instructions, the computer-readable instructions, when executed by the processor, performing a plurality of operations including:

processing a medical image to generate an encoded intermediate image representing a structural feature of the medical image;

segmenting the encoded intermediate image according to a first feature, to generate a segmented intermediate image including the first feature;

processing the encoded intermediate image and the segmented intermediate image based on an attention mechanism, to generate an attention-enhanced detected intermediate input image; and performing second feature detection on the detected intermediate input image, to determine whether an image region of the detected intermediate input image in which the first feature is located comprises a second feature.

15. The computing device according to claim 14, wherein the processing a medical image to generate an encoded intermediate image comprises:

processing the medical image by using an encoding neural network to generate the encoded intermediate image, the encoding neural network comprising M processing layers, M being a positive integer, the processing layer comprising at least one of a convolution network, a transposed convolutional network, and a pooling layer;

the processing the medical image by using an encoding neural network further comprises:

processing the medical image by using a first processing layer of the encoding neural network, to output a first encoded intermediate image; and processing, by using an $(m1)^{th}$ processing layer of the encoding neural network, an $(m1-1)^{th}$ encoded intermediate image outputted by an $(m1-1)^{th}$ processing layer of the encoding neural network, to output an $(m1)^{th}$ encoded intermediate image, m1 being a positive integer, and m1 being greater than 1 and less than or equal to M; and the processing the encoded intermediate image, to segment a first feature and generate a segmented intermediate image further comprises:

processing the encoded intermediate image by using a segmentation neural network, to segment the first feature and generate the segmented intermediate image, the segmentation neural network comprising M processing layers, an $M^{th}$ encoded intermediate image outputted by an $M^{th}$ processing layer of the encoding neural network being processed by using a first processing layer of the segmentation neural network, to output a first segmented intermediate image;

processing, by using an $(m2)^{th}$ processing layer of the segmentation neural network, an $(m2-1)^{th}$ segmented intermediate image outputted by an $(m2-1)^{th}$ processing layer of the segmentation neural network and an $(M-m2+1)^{th}$ encoded intermediate image outputted by an $(M-m2+1)^{th}$ processing layer of the encoding neural network, to output an $(m2)^{th}$ segmented intermediate image, m2 being a positive integer, and m2 being greater than 1 and less than or equal to M; and processing, by using the convolution network, an $M^{th}$ segmented intermediate image outputted by an $M^{th}$ processing layer of the segmentation neural network, to generate a segmentation result of the first feature.

16. The computing device according to claim 14, wherein the medical image is a computed tomography angiography (CTA) image, the first feature is an artery feature, and the second feature is at least one of an aneurysm feature, an arterial vessel wall calcification feature, and an arterial vessel occlusion feature.

17. The computing device according to claim 14, wherein the performing second feature detection on the detected intermediate input image comprises: outputting a detection result of the second feature, the detection result comprising: a parameter of a prediction box of the second feature and a prediction probability that the prediction box comprises the second feature; and the plurality of operations further comprise: displaying a candidate box on an image comprising the first feature, the candidate box comprising the prediction box of the second feature detected by using the detection neural network.

18. A non-transitory computer-readable storage medium, storing computer-readable instructions, the computer-readable instructions, when executed by a processor of a computing device, causing the computing device to perform a plurality of operations including:

processing a medical image to generate an encoded intermediate image representing a structural feature of the medical image;

segmenting the encoded intermediate image according to a first feature, to generate a segmented intermediate image including the first feature;

processing the encoded intermediate image and the segmented intermediate image based on an attention mechanism, to generate an attention-enhanced detected intermediate input image; and performing second feature detection on the detected intermediate input image, to determine whether an image region of the detected intermediate input image in which the first feature is located comprises a second feature.

19. The non-transitory computer-readable storage medium according to claim 18, wherein the processing a medical image to generate an encoded intermediate image comprises:

processing the medical image by using an encoding neural network to generate the encoded intermediate image, the encoding neural network comprising M processing layers, M being a positive integer, the processing layer comprising at least one of a convolution network, a transposed convolutional network, and a pooling layer;

the processing the medical image by using an encoding neural network further comprises:

processing the medical image by using a first processing layer of the encoding neural network, to output a first encoded intermediate image; and processing, by using an $(m1)^{th}$ processing layer of the encoding neural network, an $(m1-1)^{th}$ encoded intermediate image outputted by an $(m1-1)^{th}$ processing layer of the encoding neural network, to output an $(m1)^{th}$ encoded intermediate image, m1 being a positive integer, and m1 being greater than 1 and less than or equal to M; and the processing the encoded intermediate image, to segment a first feature and generate a segmented intermediate image further comprises:

processing the encoded intermediate image by using a segmentation neural network, to segment the first feature and generate the segmented intermediate image, the segmentation neural network comprising M processing layers, an $M^{th}$ encoded intermediate image outputted by an $M^{th}$ processing layer of the encoding neural network being processed by using a first processing layer of the segmentation neural network, to output a first segmented intermediate image;

processing, by using an $(m2)^{th}$ processing layer of the segmentation neural network, an $(m2-1)^{th}$ segmented intermediate image outputted by an $(m2-1)^{th}$ processing layer of the segmentation neural network and an $(M-m2+1)^{th}$ encoded intermediate image outputted by an $(M-m2+1)^{th}$ processing layer of the encoding neural network, to output an $(m2)^{th}$ segmented intermediate image, m2 being a positive integer, and m2 being greater than 1 and less than or equal to M; and processing, by using the convolution network, an $M^{th}$ segmented intermediate image outputted by an $M^{th}$ processing layer of the segmentation neural network, to generate a segmentation result of the first feature.

20. The non-transitory computer-readable storage medium according to claim 18, wherein the medical image is a computed tomography angiography (CTA) image, the first feature is an artery feature, and the second feature is at least one of an aneurysm feature, an arterial vessel wall calcification feature, and an arterial vessel occlusion feature.

* * * * *